United States Patent
Ripley

(10) Patent No.: US 9,707,595 B2
(45) Date of Patent: Jul. 18, 2017

(54) HOUSEHOLD HAZARDOUS WASTE RECOVERY

(71) Applicant: Waste Repurposing International, Inc., Austin, TX (US)

(72) Inventor: Christopher B Ripley, Lichtfield, CT (US)

(73) Assignee: Waste Repurposing International, Inc., Austin, TX (US)

( * ) Notice: Subject to any disclaimer, the term of this patent is extended or adjusted under 35 U.S.C. 154(b) by 0 days.

(21) Appl. No.: 15/173,569

(22) Filed: Jun. 3, 2016

(65) Prior Publication Data

US 2017/0174440 A1    Jun. 22, 2017

Related U.S. Application Data

(63) Continuation-in-part of application No. 14/971,718, filed on Dec. 16, 2015.

(51) Int. Cl.
| | | |
|---|---|---|
| *B07C 5/34* | (2006.01) | |
| *B65G 43/08* | (2006.01) | |
| *G05B 15/02* | (2006.01) | |
| *B07C 5/342* | (2006.01) | |
| *G06K 9/46* | (2006.01) | |

(52) U.S. Cl.
CPC ............ *B07C 5/3412* (2013.01); *B07C 5/342* (2013.01); *B65G 43/08* (2013.01); *G05B 15/02* (2013.01); *G06K 9/46* (2013.01); *B07C 2501/0054* (2013.01)

(58) Field of Classification Search
CPC . B07C 5/3412; B07C 2501/0054; B07C 5/34; B07C 5/342; B65G 43/08
See application file for complete search history.

(56) References Cited

U.S. PATENT DOCUMENTS

| | | | | |
|---|---|---|---|---|
| 4,244,650 | A * | 1/1981 | Garfunkel | B07C 5/126 250/223 B |
| 4,414,566 | A * | 11/1983 | Peyton | B07C 5/10 198/340 |
| 5,100,005 | A * | 3/1992 | Noble | B07C 5/34 206/459.5 |
| 5,186,336 | A * | 2/1993 | Pippin | B07C 5/3412 198/367.2 |
| 5,314,072 | A * | 5/1994 | Frankel | B07C 5/3408 209/44.1 |
| 5,447,017 | A | 9/1995 | Becher et al. | |

(Continued)

FOREIGN PATENT DOCUMENTS

WO    2012069839    5/2012

OTHER PUBLICATIONS

PCT/US16,67369, "International Search Report and Written Opinion", May 3, 2017, 9 pages.

*Primary Examiner* — Thomas Randazzo
(74) *Attorney, Agent, or Firm* — Cesari & Reed LLP; R. Michael Reed

(57) ABSTRACT

In certain embodiments, a system may include at least one optical sensor configured to capture optical data associated with a waste product and a processor coupled to the at least one optical sensor. The processor may be configured to determine information about the waste product based on the optical data and to selectively direct the waste product to a selected destination in response to determining the information.

17 Claims, 14 Drawing Sheets

(56) References Cited

U.S. PATENT DOCUMENTS

| | | | |
|---|---|---|---|
| 5,794,788 A * | 8/1998 | Massen | B07C 5/126 209/524 |
| 7,119,689 B2 * | 10/2006 | Mallett | G06F 17/60 209/583 |
| 7,264,124 B2 * | 9/2007 | Bohlig | B03B 9/061 209/30 |
| 7,380,386 B2 * | 6/2008 | Spatafora | B65B 19/28 53/444 |
| 7,416,142 B2 * | 8/2008 | Baker | B07C 5/122 100/225 |
| 7,501,951 B2 | 3/2009 | Maruca et al. | |
| 7,562,025 B2 * | 7/2009 | Mallett | B07C 7/005 206/366 |
| 7,564,943 B2 | 7/2009 | Sommer | |
| 7,809,194 B2 * | 10/2010 | Zhang | G06K 9/4604 382/181 |
| 7,893,378 B2 * | 2/2011 | Kenny | B03B 9/06 209/576 |
| 8,195,328 B2 * | 6/2012 | Mallett | A61L 11/00 221/102 |
| 8,459,461 B2 | 6/2013 | Borowski et al. | |
| 8,584,867 B2 * | 11/2013 | Gould | A22C 17/002 209/552 |
| 9,114,435 B2 | 8/2015 | Depres | |
| 9,120,131 B2 | 9/2015 | Sundholm | |
| 9,381,546 B2 | 7/2016 | Miyasaka | |
| 9,405,992 B2 | 8/2016 | Badholm | |
| 2006/0036407 A1 | 2/2006 | Smith | |
| 2007/0132842 A1 | 6/2007 | Morris | |
| 2008/0257795 A1 * | 10/2008 | Shuttleworth | B07C 5/34 209/576 |
| 2010/0222917 A1 | 9/2010 | Bohlig | |
| 2011/0060451 A1 | 3/2011 | Borowski et al. | |
| 2013/0168300 A1 | 7/2013 | Malone | |
| 2014/0050397 A1 * | 2/2014 | Badholm | B07C 5/3412 382/165 |
| 2014/0343720 A1 * | 11/2014 | Danelski | B65G 43/08 700/225 |
| 2015/0034534 A1 | 2/2015 | Mallet | |
| 2015/0081090 A1 * | 3/2015 | Dong | B07C 5/3422 700/230 |
| 2015/0372753 A1 * | 12/2015 | Jovicic | H04B 10/116 398/172 |

* cited by examiner

HOUSEHOLD HAZARDOUS WASTE RECOVERY

CROSS-REFERENCE TO RELATED APPLICATION(S)

This application is a continuation-in-part of and claims priority to co-pending U.S. patent application Ser. No. 14/971,718, filed on Dec. 16, 2015 and entitled "Household Hazardous Waste Recovery", which is incorporated herein by reference in its entirety.

FIELD

The present disclosure is generally related to devices, systems, and methods of waste recovery systems and methods, and more particularly, to devices systems and methods of identifying and sorting waste products.

BACKGROUND

Waste products may be processed and separated into different categories. Certain types of products, such as chemical products, paint products, and other products (including those that cannot be identified), may sometimes be classified as hazardous waste products, which cannot be disposed of in a landfill. Once classified as hazardous waste, such products are typically burned. For example, this past year, approximately five hundred thirty thousand tons of HHW (e.g., laundry detergent, motor oil, bleach, and the like) were processed at collection facilities. Such items are safe enough to place on store shelves and to allow consumers to purchase them without a license and to transport them in a standard automobile. However, once such items reach the waste collection facility, such items are typically classified as hazardous and are burned, which process is environmentally questionable and very expensive.

Other waste items, including recyclable waste, may be dumped and sorted at a waste facility before being disposed of in a landfill. In some instances, recyclable waste, household hazardous waste, and other items may be thrown away in the trash and can find its way into a landfill if it is not identified and captured during sorting.

SUMMARY

In certain embodiments, a system includes one or more optical sensors configured to capture optical data of a plurality of waste products, including bar codes (if any) associated with the packaging of the waste products. The system may include a controller coupled to the optical sensors and a marking system responsive to the controller to apply a temporary marking on identified waste products for sorting into an appropriate bin. In a particular embodiment, the marking system may include one or more light sources configured to direct a focused beam of light onto an identified product. In some embodiments, the marking system may include one or more lasers configured to illuminate selected waste products. Other embodiments are also possible.

In certain embodiments, a system may include at least one optical sensor configured to capture optical data associated with a waste product and a processor coupled to the at least one optical sensor. The processor may be configured to determine information about the waste product based on the optical data and to selectively direct the waste product to a selected destination in response to determining the information. In some aspects, the system may include at least one optical transmitter configured to emit a visible marker and to direct the visible marker onto the waste product.

In other embodiments, a device may include one or more optical sensors configured to capture optical data associated with packaging of a waste product, and a processor coupled to the one or more optical sensors. The device may further include a memory accessible to the processor and configured to store instructions that, when executed cause the processor to receive optical data corresponding to a waste product from the optical sensors. The instructions may further cause the processor to search one or more data sources to identify the waste product based on the optical data and selectively direct the waste product to a selected destination in response to identifying the waste product. In some aspects, the device may control one or more optical transmitters to apply a visible marker to the waste product and may control a light associated with a selected destination to direct the marked product to the selected destination.

In still other embodiments, a method may include receiving optical data corresponding to a waste product from one or more optical sensors of a waste product identification system. The method may also include searching, using a processor, one or more data sources to identify the waste product based on the optical data. In response to identifying the waste product, the method may further include selectively directing the waste product to a selected destination.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
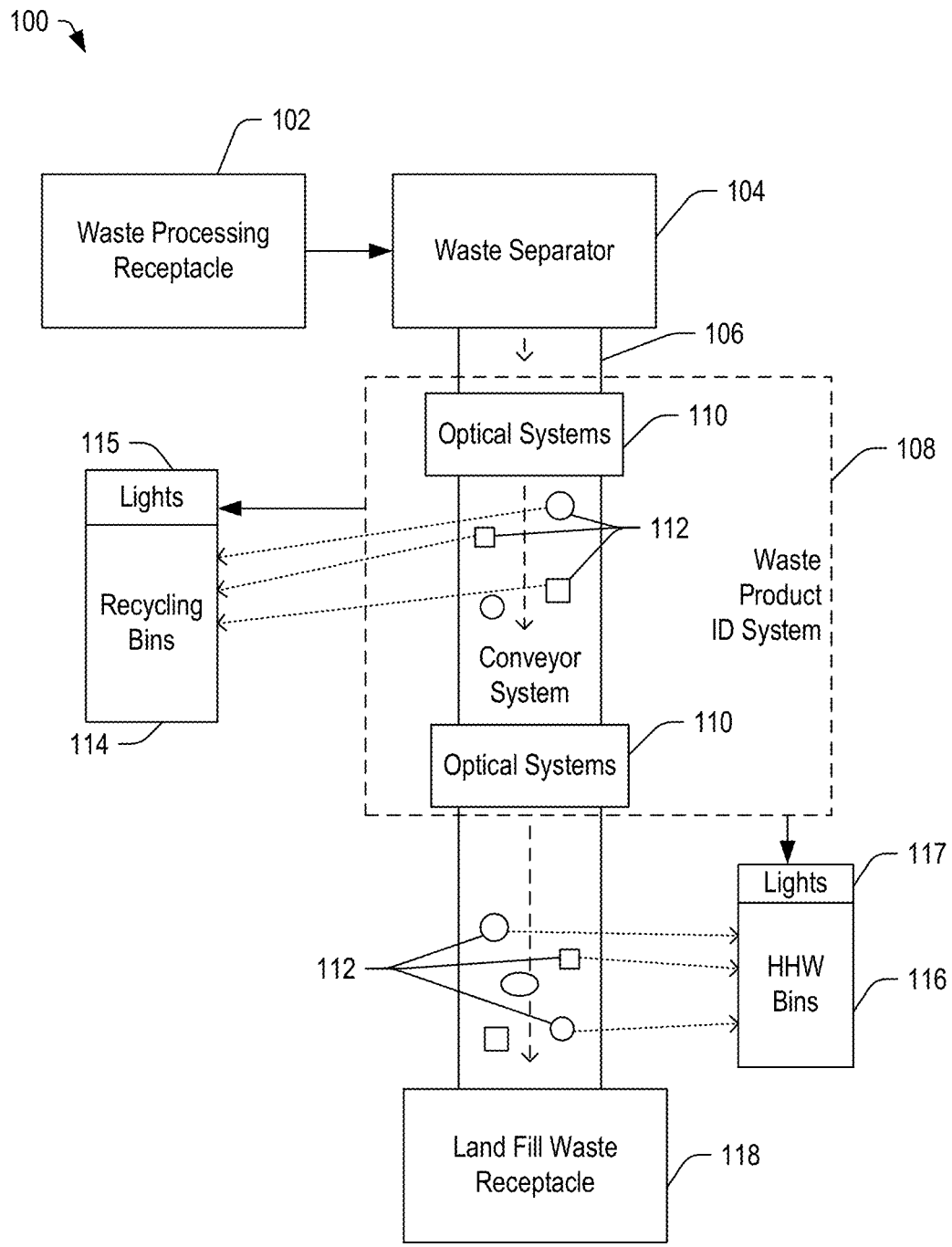
FIG. 1 is a block diagram of a system configured to process waste, in accordance with certain embodiments of the present disclosure.

Embodiments of systems, devices, and methods are described below that may be used to optically identify and visibly mark waste products from a stream of waste products to assist workers in removing the marked waste products from the stream. In some embodiments, waste products may be advanced along a conveyor belt next to or beneath a system, which may capture images of the waste product, identify the waste product based on the images, determine a destination location for the device, and direct the waste product to a destination, such as a storage bin. In certain embodiments, the system may direct the waste product to a destination by activating a robotic arm configured to grab the waste product, remove it from the conveyor and deliver it to the destination. In another embodiment, the system may direct the waste product to a destination by providing a visible marker on the waste product in response to determining the destination location. In some embodiments, the visible marker may include a light beam directed onto the product packaging. In certain embodiments, the light beam may assist an employee in sorting the waste product into its appropriate destination according to a color of the light beam, for example.

In certain embodiments, the systems or devices may include the processing circuitry configured to identify a particular waste product based on optical data captured by one or more sensors. Once identified, the system may determine a destination location for the device and may visibly mark the waste product by illuminating the product with a color, a visible shape, or another visible marker to assist a worker in detecting the waste product for removal and placement. In some embodiments, the processing circuitry may be configured to communicate with one or more databases to identify the waste product by comparing data derived from the optical data to optical data stored in a database to determine a correspondence or a match.

In some embodiments, a method of waste product recovery may include presenting the waste product to one or more optical sensors (such as bar code readers, cameras, and so on). Optical data determined by the optical sensors is provided to a processor, which may search one or more data sources based on the optical data to locate the waste product. In certain embodiments, when the waste product is located, an audio element may emit a tone or sound, which may be similar to the sound produced by bar code scanners at a grocery store. The processor may also return information to the system indicating a bin into which the product should be sorted.

In some embodiments, the product may move along a conveyor system and through a "laser fence" configured to see the product pass through it, and the system may determine the time it will take for the waste product to reach a position adjacent to the bin along the conveyor system. At the determined time, the system may control an actuator to rotate an arm across the conveyor to direct the waste product into the identified bin. The system may record the product type and weight in a record associated with the bin. Alternatively, at the determined time, the system may visibly mark the waste product and illuminate a light above the destination bin so that a worker can remove the waste product from the conveyor and deliver it to the selected bin. Other embodiments are also possible.

FIG. 1 is a block diagram of a system 100 configured to process waste, in accordance with certain embodiments of the present disclosure. The system 100 may include a waste processing receptacle 102 that may be configured to receive waste from one or more delivery vehicles, such as garbage trucks. The system 100 may further include a waste separator 104 that may be configured to tear open garbage bags and separate the waste, delivering the solid waste to a conveyor system 106. The system 100 may further include a waste product identification (ID) system 108 adjacent to the conveyor system 106. The waste product ID system 108 may be configured to capture images of waste products 112 as the conveyor system 106 advances the waste products 112 along a path.

In certain embodiments, the optical systems 110 may be configured to capture images of the waste products, and the waste product ID system 108 may be configured to identify at least some of the waste products 112 based on the images. Once the waste products 112 identified, the waste product ID system 108 may be configured to apply a visible marker or indicator on the identified waste products 112 as the waste products 112 advance along the conveyor system 106. The visible marker or indicator may include a beam of light of a selected color, which may indicate to a worker or to a device that the particular waste product should be removed from the waste stream on the conveyor system 106 and redirected to an appropriate bin, such as the recycling bins 114 or the household hazardous waste (HHW) bins 116.

In some embodiments, in addition to the visible marker, the waste product ID system 108 may control one or more lights 115 associated with recycling bins 114 to indicate a particular one of the recycling bins 114 into which an identified recyclable waste product should be delivered. Further, the waste product ID system 108 may control one or more lights 117 associated with HHW bins 116 to indicate a particular one of the HHW bins 116 into which an identified HHW waste product should be delivered. In some embodiments, the lights 115 and 117 may be color coded, and the visible markers or indicators applied to the identified waste products 112 may be correspondingly color coded to assist a worker or device in retrieving and placing the waste product in a suitable bin. Products that are not identified by the waste product ID system or by workers may be delivered to a land fill waste receptacle 118. In some embodiments, instead of a worker, the system 100 may include a device, such as a robotic arm, which may be controlled to pick up and place an identified waste product into a selected destination bin.

The waste product ID system 108 may identify waste products that can be recycled or repurposed, thereby reducing the quantity of products that end up in landfills. Further, the optical processing capabilities of the waste product ID system 108 may identify certain recyclable and HHW waste products with greater precision than the human eye and assisting workers in separating such products from landfill waste. Other embodiments are also possible.

Figure 2:
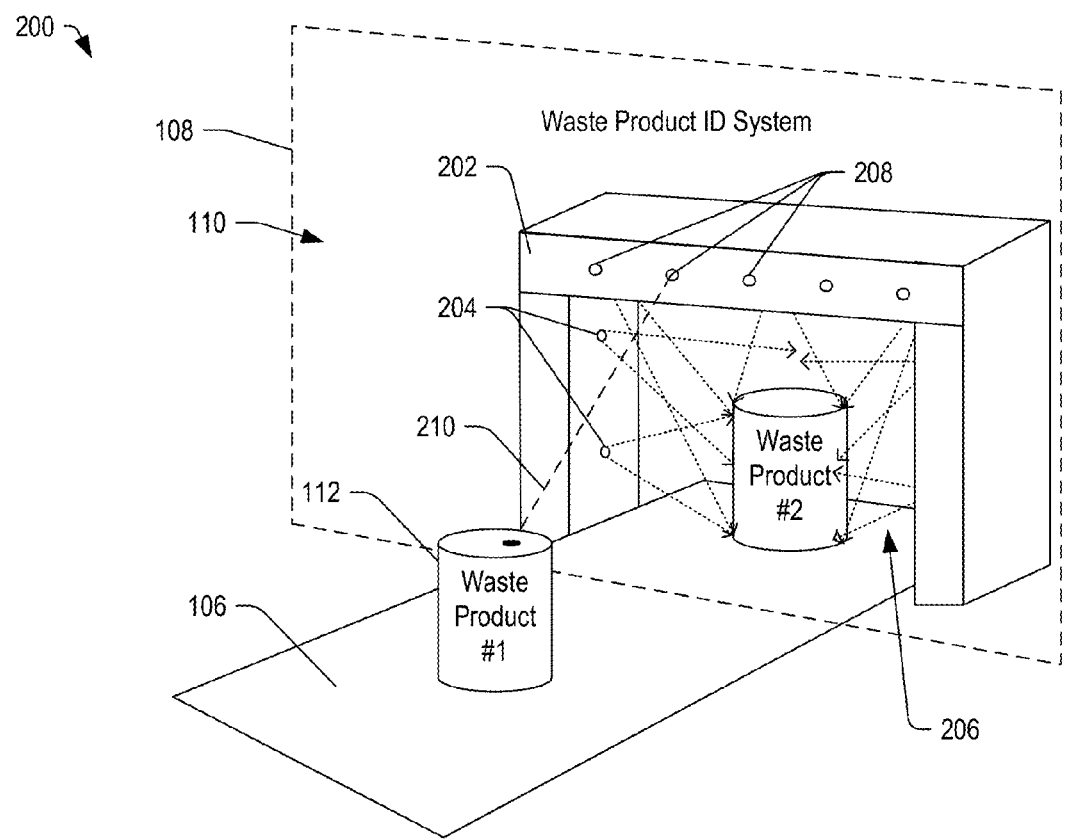
FIG. 2 is a block diagram of a system configured to identify waste products within the processed waste, in accordance with certain embodiments of the present disclosure.

FIG. 2 is a block diagram of a system 200 configured to identify waste products within the processed waste, in accordance with certain embodiments of the present disclosure. The system 200 may include the waste product ID system 108, the optical systems 110, and the conveyor system 106. Further, the system 200 may be configured to optically process waste products 112 as discussed above with respect to the system 100 of FIG. 1.

The optical system 110 may include a structure 202 adjacent to the conveyor system 106. The structure 202 may extend over the conveyor system 106 (as shown) or may extend along one or both sides of the conveyor system 106. The structure 202 may house circuitry including one or more optical sensors 204, which may be directed toward the conveyor system 106 from one or both sides, from above, or from any combination thereof to capture optical data, as generally indicated at 206. Further, the circuitry of the structure 202 may further include light emitting or transmitting elements 208 configured to apply a visible marker to an identified waste product 112. In the illustrated example, the light emitting or transmitting elements 208 may selectively direct a beam of light 210 onto an identified waste product without directing light beams onto other waste products. The beam of light may be visible on the identified waste product 112.

As discussed above with respect to FIG. 1, the waste product ID system 108 may control one or more lights associated with various destination bins and may illuminate the light associated with a particular destination bin in response to identifying the waste product. In some embodiments, the beam of light 210 may have a color parameter corresponding to a particular type of identified product. Further, the lights above the destination bins may also include a color parameter such that the beam of light 210 may be color coded to match with the illuminated light of the destination bin to further assist a worker or device.

Figure 3:
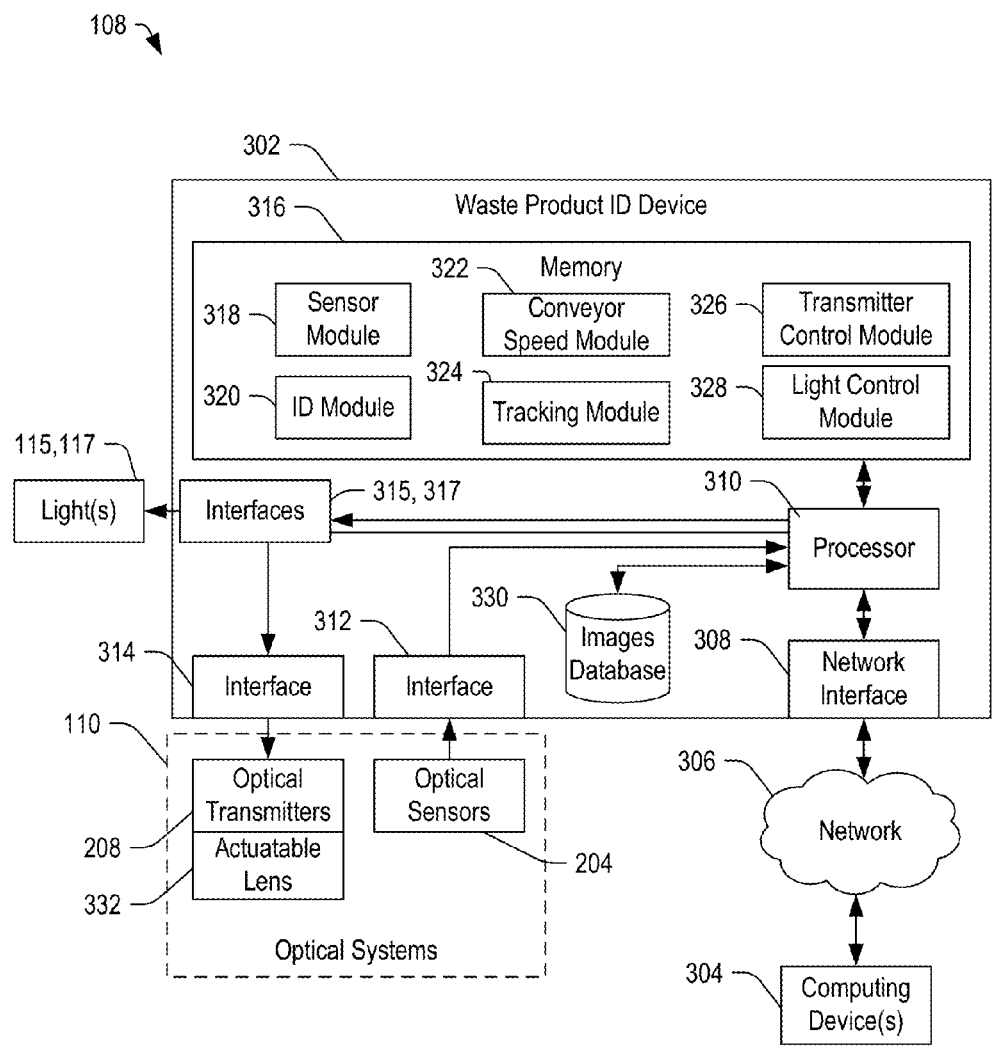
FIG. 3 is a block diagram of a waste product identification system, in accordance with certain embodiments of the present disclosure.

FIG. 3 is a block diagram of a waste product ID system 300, in accordance with certain embodiments of the present disclosure. The waste product ID system 108 may include a waste product ID device 302 coupled to the optical systems 108 and to one or more lights 115 and 117 associated with the destination bins (recycling, HHW, other bins, or any combination thereof). Further, the waste product ID device 302 may communicate with one or more computing devices 304 via a network 306. The one or more computing devices 304 can include server systems, databases, other computing systems, or any combination thereof.

The waste product ID device 302 can include a network interface 308 configured to communicate with the one or more computing devices 304 through the network 306. Further, the waste product ID device 302 may include a processor 310 coupled to the network interface 308. The processor 310 may also include an optical sensor interface 312 configured to couple to the optical sensors 204 of the optical system 208. Further, the processor 310 may be coupled to an optical transmitter interface 314 configured to couple to the optical transmitters 208 (e.g., light sources, light emitting devices, laser devices, other light emitting elements, or any combination thereof) within the optical systems 110. The processor 310 may also be coupled to interfaces 315 and 317, which may be coupled to lights 115 and 117, respectively. The processor 310 may also be coupled to a memory 316.

The memory 316 may store data and instructions that, when executed by the processor 310, cause the processor 310 to perform a variety of operations. The memory 316 can include a sensor module 318 that, when executed, may cause the processor 310 to receive data from the optical sensors 204 and to process the optical sensor data to determine images. The memory 316 may also include an ID module 320 that, when executed, may cause the processor 310 to identify a waste product by comparing optical data received from the optical sensors 204 to images stored in an images database 330 to determine a correspondence or a match. If the correspondence is close, but an exact match cannot be determined, the ID module 320 may apply a visible marker to the waste product indicating that the waste product should be manually inspected. In an example, the visible marker indicating the need for manual inspection may have a particular color (such as red) or shape (such as a question mark). Other embodiments are also possible.

The memory 316 can also include a conveyor speed module 322 that, when executed, may cause the processor 310 to determine a speed of the conveyor system 106. The memory 316 may also include a tracking module 324 that, when executed, may cause the processor 310 to track the progress of waste products as they move along the conveyor system 106 based on an initial location and a speed of the conveyor system 106. The memory 316 may further include a transmitter control module 326 that, when executed, may cause the processor 310 to control the optical transmitters 208 to direct a beam of light onto an identified waste product. In some embodiments, the transmitter control module 326 may selectively control one or more of the optical transmitters 208 to emit beams of light and may control an actuatable lens 332 (or another actuator or beam splitter) to direct the light onto a waste product and to maintain the light on the waste product as it travels along the conveyor system 106. The memory 316 may also include a light control module 328 that, when executed, may cause the processor 310 to determine a destination bin for a particular waste product and to selectively send a control signal to one of the lights 115 and 117 via one of the interfaces 315 and 317.

In some embodiments, the waste product ID device 302 may receive optical data corresponding to one or more waste products. The processor 310 may utilize the ID module 320 to search the images database 330 to identify optical data that matches the optical data from the optical sensors 204. If a match is found, the processor 310 may utilize the conveyor speed module 322 and the tracking module 324 to determine the position of the waste produce on the conveyor system 106 over time and may use the transmitter control module 326 to control the optical transmitters 208 and the actuatable lens 332 (or other actuator) to direct light onto the identified waste product. Further, the waste product ID device 302 may communicate a control signal to one, but not all, of the lights 115 and 117 to identify a destination bin for the identified waste product.

In certain embodiments, the waste product ID device 302 may utilize the transmitter control module 326 to selectively illuminate a first identified waste product with a first beam of light having a first color and to selectively illuminate a second identified waste product with a second beam of light having a second color. The waste product ID device 302 may illuminate the first and second waste products substantially simultaneously. In some embodiments, the waste product ID device 302 may selectively illuminate multiple identified waste products concurrently.

In certain embodiments, the waste product ID device 302 may utilize the transmitter control module 326 to project a first symbol onto a first identified waste product and to project a second symbol onto a second identified waste product. The waste product ID device 302 may project a plurality of different symbols onto different identified waste products. In some embodiments, the symbols may include letters, numbers, geometric shapes, or any combination thereof. In some embodiments, the waste product ID device 302 may project the different symbols at the same time onto different waste products. In some embodiments, the waste product ID device 302 may project the different symbols substantially concurrently as the waste products are moved along the conveyor system 106.

In the above-discussion, it is assumed that the waste product ID system 108 may identify the waste product by searching its database. Where the waste product cannot be identified from such a search, the system may store the captured optical data in the database for further processing at another time. In some embodiments, operators may access the unidentified data to identify it or to perform further research. Additionally, in some embodiments, over time, the waste product ID system 108 may communicate with one or more computing devices 304 through the network 306 to search various web sites to attempt to identify the waste product based on the optical data. Alternatively, or in addition, the waste product ID system 108 may communicate an alert to one or more computing devices 304 to acquire assistance in identifying the waste product based, at least in part, on the optical data. Further, optical data associated with unidentified waste products may be stored in memory 316 for subsequent processing. Other embodiments are also possible.

After sorting the waste products into suitable bins, the waste products may be processed again to further refine the sorting process. In an example, HHW waste products may be sorted a second time using an HHW specific sorting system, such as that described below with respect to FIG. 4.

Figure 4:
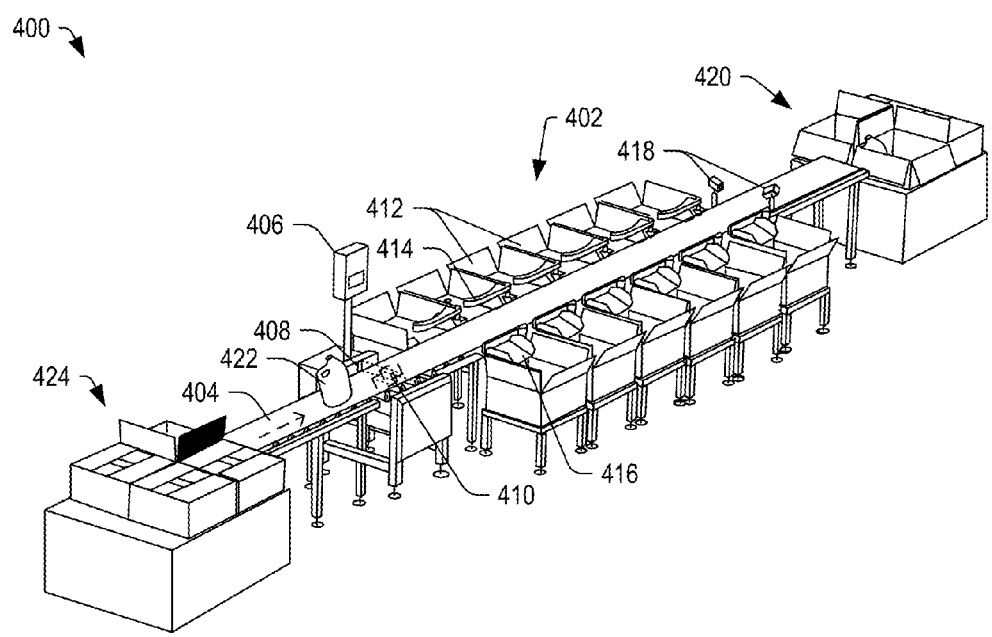
FIG. 4 is a perspective view of a system configured to identify and sort HHW products, in accordance with certain embodiments of the present disclosure.

FIG. 4 is a perspective view of a system 400 configured to identify and sort HHW products, in accordance with certain embodiments of the present disclosure. The system 400 may include a sorting system 402 configured to sort discarded products into an appropriate sorting bin. The system 400 may include a conveyor belt 404 configured to advance HHW products, such as the HHW product 422, past a bar code reader 408 associated with a sorting controller 406, which may optically scan the product using an optical device 408 (such as a bar code scanner, a camera, another type of optical sensor, or any combination thereof). The scan by the optical device 408 is generally indicated at 410. In certain embodiments, an optical device 408 may be provided on either side of the conveyor belt 404.

In certain embodiments, HHW items may be selected from bins 424 and may be placed on the conveyor belt 404. Such placement may be automated (such as by a robotic mechanism) or manual by employees of the waste processing center. The sorting controller 406 may use the bar code data to identify a product, determine a bin 412 into which the product should be routed, and control an actuator arm 414 to extend over the conveyor belt 404 to direct the HHW product 422 into the selected bin 412. Once the HHW product 422 is directed into the selected bin, the sorting controller 406 may send a signal to the actuator arm 414 to cause the actuator arm 414 to return to a resting state. Each actuator arm 414 and associated bin 412 may include a slide element 416, which may be a sloped structure configured to ease the delivery of the HHW product 422 into the bin 412.

In certain embodiments, sorting controller 406 may be unable to identify the HHW product 422 based on the optical data, and the sorting controller 406 may cause the conveyor belt 404 to advance the HHW product 422 past one or more optical sensors 418 configured to capture optical data associated with the HHW product 422. The conveyor belt 404 may then deliver the HHW product 422 to a temporary storage bin 420. In the illustrated example, multiple temporary bins 420 are shown.

In certain embodiments, when the sorting controller 406 cannot identify the HHW product, the optical data captured by the optical sensors 418 may be used to identify the HHW product 422. In certain embodiments, the optical data may include images including pictures of the packaging, product name data, bar code data, other data, or any combination thereof. In certain embodiments, the bar code data may not have been readable by the bar code readers 408 or may have been missing from an HHW product database accessible to the sorting controller 406 to sort the HHW product 422 into a suitable bin.

In certain embodiments, a processor may be configured to automatically search for similar shaped containers, product names, product labels, manufacturer names, SKU data, other information, or any combination thereof to identify the product and the corresponding composition of the HHW product. In certain embodiments, the results of the search may be presented within a GUI for review by an operator, who may populate a data record with such information so that subsequent scanning of a similar product will result in correct categorization of the product. In certain embodiments, HHW products in the temporary bin 420 may be re-processed so that they may be correctly categorized. Other embodiments are also possible.

Figure 5:
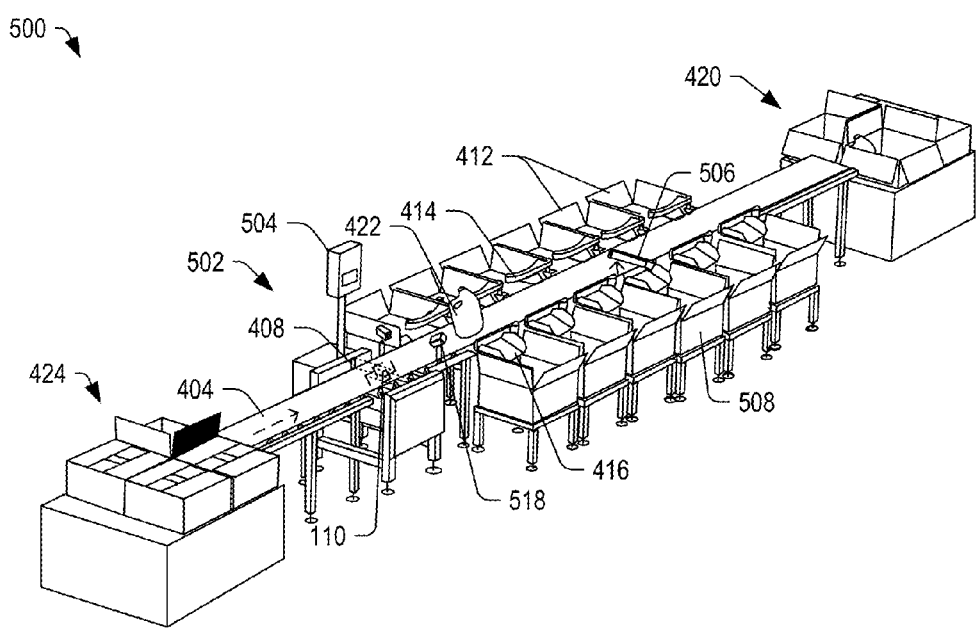
FIG. 5 is a perspective view of a system configured to identify and sort HHW products, in accordance with certain embodiments of the present disclosure.

FIG. 5 is a perspective view of a system 500 configured to identify and sort HHW products, in accordance with certain embodiments of the present disclosure. The system 500 may include all of the elements of the system 400 of FIG. 4, except that the optical sensors 418 are moved to a position that is closer to the sorting controller 406, providing a sorting apparatus 502. In certain embodiments, the sorting controller 406 may include the processing circuitry for searching for product information for unidentified or unrecognized HHW products. In the illustrated example, the sorting controller 504 may include the circuitry of sorting controller 406 as well as circuitry for controlling the optical sensors 518. In an alternative embodiment, the In the illustrated example, the HHW product 422 was recognized by the sorting controller 504, which controls the actuator arm 506 to extend over the conveyor belt in order to sweep the HHW product into the bin 508. If the HHW product 422 was not recognized by the sorting controller 504, the sorting controller 504 may control the optical sensors 518 to capture optical data associated with the HHW product 422 before advancing the HHW product into the temporary bin 420. The optical data may then be used to attempt to assemble (automatically or manually) product information corresponding to the HHW product 422.

In one embodiment, the optical sensors 518 may be positioned after a scale in a direction of the movement of the conveyor belt 404. In another embodiment, the optical sensors 518 may be located just before the scale, adjacent to the scale, or at other locations before the conveyor belt 404 or along the path of the conveyor belt 404, depending on the implementation. Other embodiments are also possible.

The examples of FIGS. 4 and 5 depict automated systems that include a conveyor belt 404 and a sorting controller 406 or 504 configured to send control signals to actuator arms 414 to selectively extend or retract a selected one of the actuator arms 414 to direct the HHW product 422. In an alternative embodiment, the sorting may be at least partially manual, and the sorting controller 406 and 504 may illuminate a light or activate another indicator associated with a selected bin to direct a worker to place the HHW product in the selected bin. Other embodiments are also possible.

Figure 6:
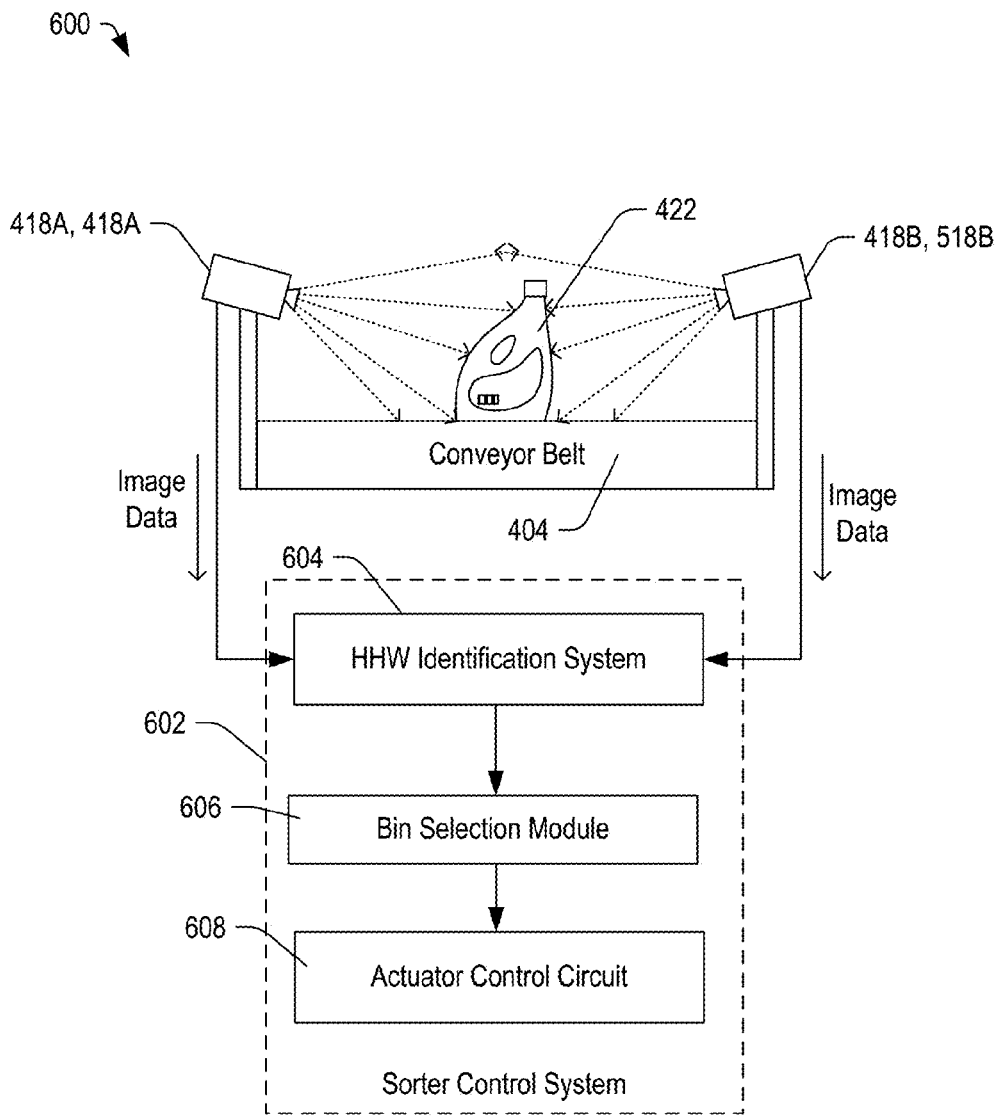
FIG. 6 is a block diagram of a portion of a system configured to identify and sort HHW products, in accordance with certain embodiments of the present disclosure.

FIG. 6 is a block diagram of a portion 600 of a system configured to identify and sort HHW products, in accordance with certain embodiments of the present disclosure. The portion 600 may be part of the system 400 of FIG. 4 or the system 500 of FIG. 5. The portion 600 includes the optical sensors 418A and 418B or 518A and 518B, for example, which may be positioned adjacent to the conveyor belt 404 to capture optical data associated with the HHW product 422.

The optical sensors 418 or 518 may be coupled to a sorter control system 602, which may include an HHW identification system 604 configured to determine identifying information about the HHW product 422 based on the optical data. The sorter control system 602 may further include a bin selection module 606 configured to determine a suitable bin for an HHW product 422 based on the identifying information. The sorter control system 602 may further include an actuator control circuit 608 configured to control at least one actuator arm 414 to extend across the conveyor belt 404 to sweep the HHW product 422 into the selected bin.

In certain embodiments, the HHW identification system 604 may include optical sensors (bar code readers, cameras, other optical sensors, or any combination thereof). Further, the HHW identification system 604 may include processing circuitry configured to process the optical data and to attempt to identify the HHW product based on the optical data. In some embodiments, the processing circuitry may search the Internet, one or more databases, other data sources, or any combination thereof.

In certain embodiments, the processing circuitry may generate a report including optical data (such as images) and other data (such as data appended to the images, data determined from the optical data, or any combination thereof) and may provide the report to one or more operators, a social media website, another site, or any combination thereof. In some embodiments, the system may host a website to encourage consumers to identify such unidentified products, and data collected from the operators, users, consumers, websites, and so on may be used to determine the product composition. Once determined, the information may be presented to an administrator or operator for review and confirmation. If confirmed, the data record for the HHW product may be appended to the database so that subsequent scans may be able to identify the product and the sorter control system 604 may sort the HHW product into the appropriate bin. Other embodiments are also possible.

Figure 7:
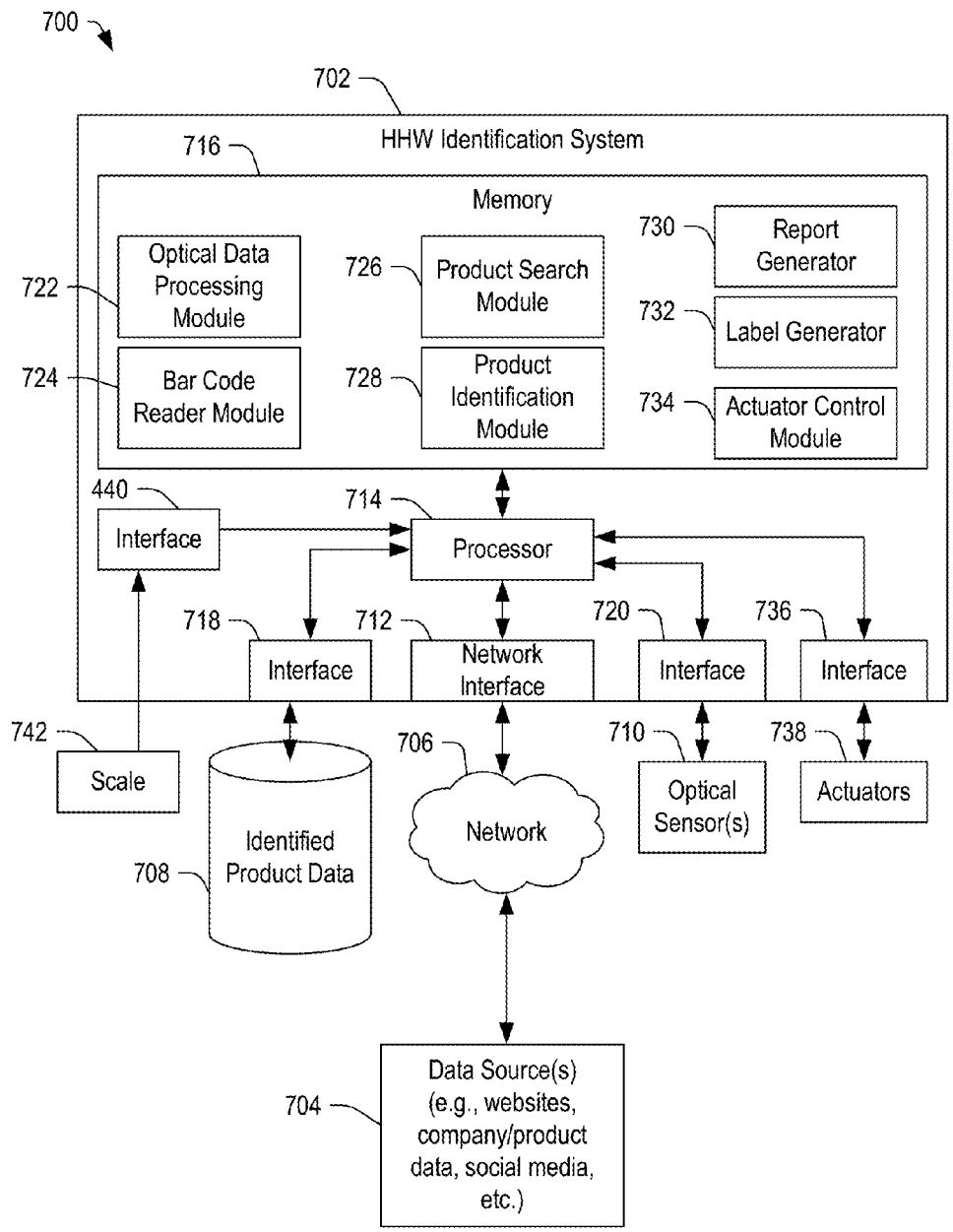
FIG. 7 is a block diagram of a system configured to identify and sort HHW products, in accordance with certain embodiments of the present disclosure.

FIG. 7 is a block diagram of a system 700 configured to identify and sort HHW products, in accordance with certain embodiments of the present disclosure. The system 700 may include elements of the system 400 of FIG. 4, the system 500 of FIG. 5, and the portion 600 of FIG. 6. The system 400 may include an HHW identification system 702 configured to communicate with one or more data sources 704 through a network 706. The data sources 704 may include websites, company data, product data, social media data, other data, or any combination thereof. Further, the HHW identification system 702 may communicate with a database 708 including identified product data, one or more optical sensors 710, and one or more actuators 738 (or actuator control circuits).

The HHW identification system 702 may include a network interface 712, which may communicate with the network 706, and may include a processor 714 coupled to the network interface 712. Further, the processor 714 may be coupled to the database 708 through an interface 718, to the optical sensors 710 through an interface 720, and to the one or more actuators 738 through an interface 736. The processor 714 may also be coupled to a memory 716, which may store data and processor-readable instructions. The memory 716 may include a hard disc drive, a flash drive, cache memory, optical storage devices (such as compact discs (CDs) and digital video discs (DVDs)), other non-volatile storage devices, or any combination thereof.

The memory 716 may include an optical data processing module 722 that, when executed, may cause the processor 714 to process the optical data, to extract the bar code information, to extract label information (such as a product identifier, a manufacturer, product data, or any combination thereof), to extract image data, or any combination thereof. In some embodiments, the optical data processing module 722 may cause the processor 714 to perform optical character recognition (OCR) on the product label to extract text information from the optical data. The memory 716 may also include a bar code reader module 724 that, when executed, may cause the processor 714 to control one or more bar code readers to scan bar code data associated with packaging of an HHW product. In certain embodiments, the bar code reader module 724 may cause the processor 714 to determine a bar code from bar code data received from the optical data processing module 722.

The memory 716 may further include a product search module 726 that, when executed, may cause the processor 714 to search the database 708 and the one or more data sources 704 based on information determined from the optical data, the bar code data, or any combination thereof. The memory 716 may include a product identification module 728 that, when executed, may cause the processor 714 to identify the HHW product based on the optical data, the bar code data, and retrieved data from the database 708, the data sources 704, or any combination thereof. In certain embodiments, the product identification module 728 may further cause the processor 714 to determine a bin in which to place an identified HHW product so that products having similar chemical compositions may be grouped together.

The memory 716 may also include a report generator 730 that, when executed, may cause the processor 714 to generate an interface (such as a graphical user interface or GUI), which may include data corresponding to one or more unidentified HHW products, optical data associated with the HHW products, data from the one or more data sources 704, product data from the database 708, other data, or any combination thereof. The report generator 730 may cause the processor 714 to provide the GUI to a destination device, such as a smart phone, a laptop computer, or another computing device. The destination device may be operated by a user, such as an administrator, an operator, or another type of user. The user may interact with the GUI via the destination device to review the HHW data and to update the record of a selected HHW product.

In certain embodiments, the memory 716 may include a label generator 732 that, when executed, may cause the processor 714 to determine when a bin of a particular HHW product is full (by weight, number of product items, another factor, available bin space, or any combination thereof) and to generate a manifest for a particular bin of HHW products having a similar composition when the bin is full. The memory 716 may also include an actuator control module 734 that, when executed, may cause the processor 714 to provide a control signal to one or more actuators 738 to selectively adjust a rotational position (extended or retracted position) of an actuator arm (such as the actuator arms 414 and 506 in FIGS. 4 and 5, respectively) to direct an HHW product to a selected bin.

In certain embodiments, the product search module 726 and the product identification module 728 may cooperate to cause the processor 714 to automatically attempt to identify the HHW product from the optical data. In certain embodiments, the product search module 726 may search available data sources to identify associated product information. The product identification module 728 may attempt to correlate the product information with the optical data and other data. Further, the product identification module 728 may interact with the report generator 730 to produce an output GUI that may be presented to an operator for verification.

In certain embodiments, the HHW identification system 702 may include an interface 740 coupled to the processor 714. The interface 740 may be coupled to a scale 742, which may be associated with the conveyor system in order to weigh HHW products. In certain embodiments, the processor 714 may correlate the weight to the optical data of an HHW product and the weight may be correlated to an identified product, when the processor 714 can determine the product based on the optical data.

In some embodiments, the product identification module 728 may utilize data determined from the optical data to search various data sources, for example, via the Internet. In some embodiments, the product identification module 728 may interact with one or more web sites to search or to post information about an unidentified HHW product to solicit information from consumers. For example, identifying data may be received from one or more social media websites, which may be in response to a request for information including a report about the HHW product. Some social media participants may find it an interesting challenge to identify such products based on image data, and may provide data that can be used to identify the HHW product. In some embodiments, the challenge may be instituted with a prize to entice users to assist in identifying the HHW product, where the prize may be awarded to the user that provides usable and verifiable information. Other embodiments are also possible.

Figure 8:
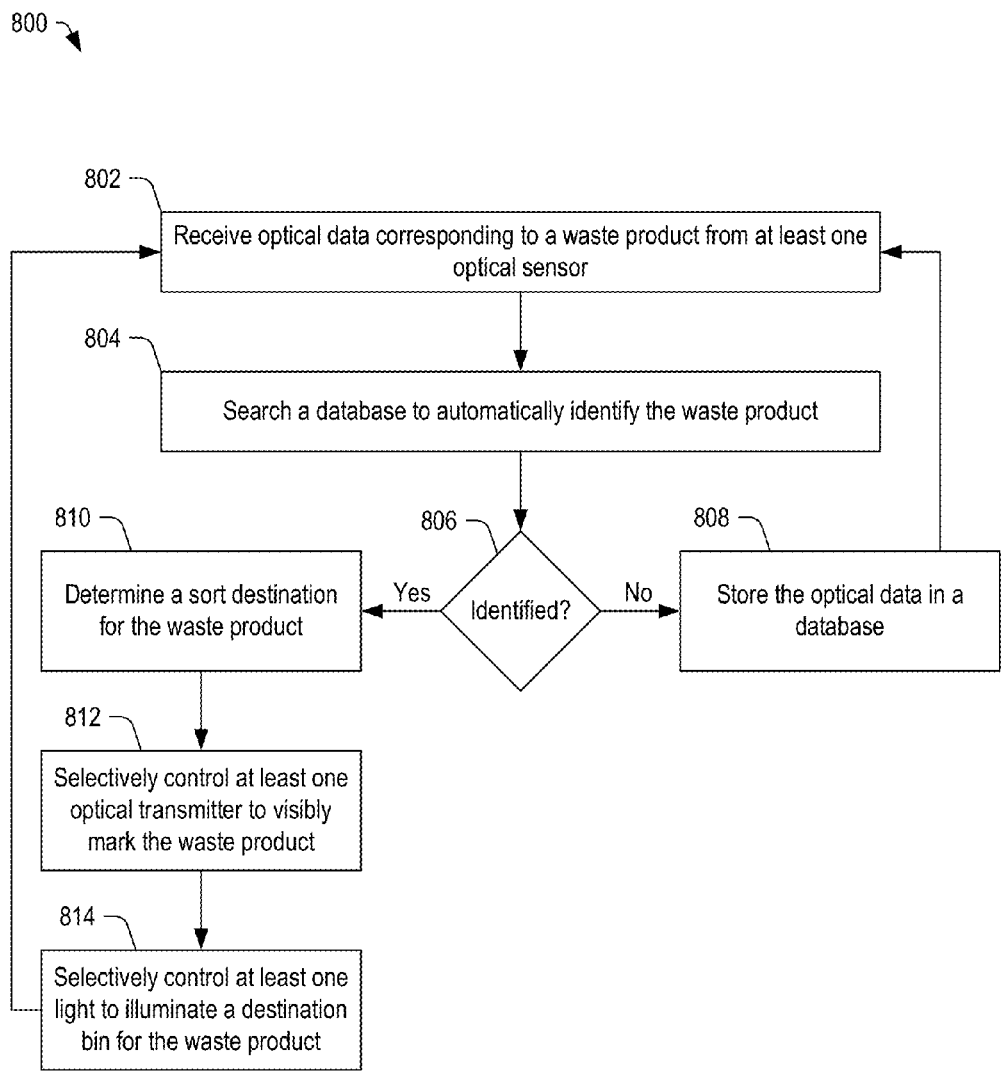
FIG. 8 is a flow diagram of a method of identifying waste products, in accordance with certain embodiments of the present disclosure.

FIG. 8 is a flow diagram of a method 800 of identifying waste products, in accordance with certain embodiments of the present disclosure. At 802, the method 800 may include receiving optical data corresponding to a waste product from at least one optical sensor. The optical sensors may be configured to capture images of the waste product. In some embodiments, the optical sensors may include cameras configured to capture images, hyperspectral cameras configured to capture optical data across a range of the electromagnetic spectrum, ultraviolet sensors, infrared sensors, and other optical sensors.

At 804, the method 800 may include searching a database to automatically identify the waste product. In some embodiments, the system may process the optical data automatically to attempt to identify the waste product based on correlations between stored optical data associated with an identified waste product and the images captured by the optical sensors.

At 806, if a waste product is not identified from the optical data, the method 800 may include storing the optical data in a database, at 808. The optical data may include the brand name, the product type, the bar code, images, other identifying data, or any combination thereof. In some instances, the packaging may be worn or partially obscured, making identification difficult. Optical data associated with unidentified waste products may be stored in the database. Otherwise, if the waste product is identified at 806, the method 800 may include determining a sort destination for the waste product, at 810. In an example, the sort destination may include a bin, a palette, a box, or another temporary storage location.

At 812, the method 800 may include selectively controlling at least one optical transmitter to visibly mark the waste product. In an example, the optical transmitter may direct a laser beam or other visible marker on the waste product. In some embodiments, the visible marker may have a selected color, which may correspond to the color of a corresponding light above the bin or other sorting destination to assist a worker in capturing and relocating the identified waste product to its selected destination.

In an embodiment, the waste products may be placed on a conveyor belt or other moving structure to advance the waste product past the optical sensors. The system may determine the rate of the conveyor belt and may track the progress of the waste product as it moves along the conveyor belt. The optical transmitter may be controlled to track the progress of the waste product and to maintain the visible marker on the waste product as it is moved.

At 814, the method 800 may include selectively controlling at least one light to illuminate a destination bin for the waste product. In some embodiments, the at least one light may have a color that may correspond to the color of the visible marker. Other embodiments are also possible.

The method 800 further includes repeating. In particular, after storing the optical data at 802 or after selectively controlling at least one light to illuminate a destination bin, the method 800 may return to 802. At 802, the method 800 may include receiving optical data corresponding to a next waste product.

In the example of FIG. 8, the method 800 may be used to sort waste products into suitable bins for further sorting. By applying a visible marker (such as a beam of light) on the waste product as it moves along the conveyor belt, a worker can readily see the identified product, can retrieve the product, and place the product into a bin that may be illuminated to assist the worker. Other embodiments are also possible.

Once the waste products are sorted into their selected bins, the bins may be delivered to another sorting system, such as a recycling system, an HHW sorting system, another sorting system, or any combination thereof. In some embodiments, the waste sorting system may identify waste products and apply visible markers to the waste products for sorting them into an appropriate bin. In some examples, the identified product may be an HHW product that may then be sorted into an HHW bin, or into a bin that is more particular to the type of HHW product. Other embodiments are also possible.

Figure 9:
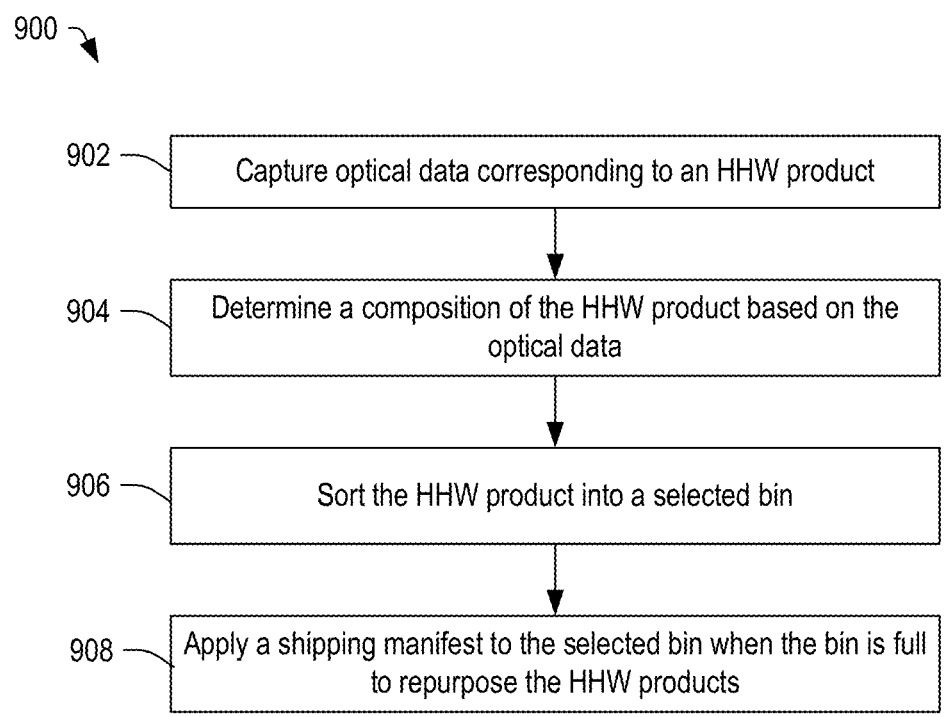
FIG. 9 is a flow diagram of a method of recovering an HHW product for repurposing, in accordance with certain embodiments of the present disclosure.

FIG. 9 is a flow diagram of a method 900 of recovering an HHW product for repurposing, in accordance with certain embodiments of the present disclosure. At 902, the method 900 may include capturing optical data corresponding to an HHW product. The optical data may be captured by one or more optical sensors positioned adjacent to a conveyor belt. In some embodiments, the one or more optical sensors can include a portable camera, a moveable camera, one or more fixed cameras, bar code scanners, other optical sensors, or any combination thereof.

At 904, the method 900 may include determining a composition of the HHW product based on the optical data. In certain embodiments, the process of determining the composition may include a variety of operations. In some embodiments, the composition may be determined by looking up the HHW product in a database based on data extracted from the optical data, including a bar code, a product name, a company name, a shape of the packaging, other data, or any combination thereof. In some embodiments, the composition may be determined by generating a report including the optical data and other data and sending the report to a manufacturer (or seller) of the product requesting product details. The composition may then be determined based on the response from the manufacturer. In some embodiments, the composition may be determined from research performed by an operator, by a search automatically performed based on the optical data, from another source, or any combination thereof.

At 906, the method 900 may include sorting the HHW product into a selected bin. In certain embodiments, the HHW product may be sorted into a bin of similar products. In an example, bleach products may be sorted into a first bin, while phosphate-based laundry detergents may be sorted into a second bin, and so on.

At 908, the method 900 may include applying a shipping manifest to the selected bin when the bin is full to repurpose the HHW products. In certain embodiments, each HHW product may be weighed and identified before the HHW product is directed into a particular bin. When the bin reaches a pre-determined weight, when the bin is full (based on area) or when the bin has a pre-determined number of items, the manifest may be generated.

Figure 10:
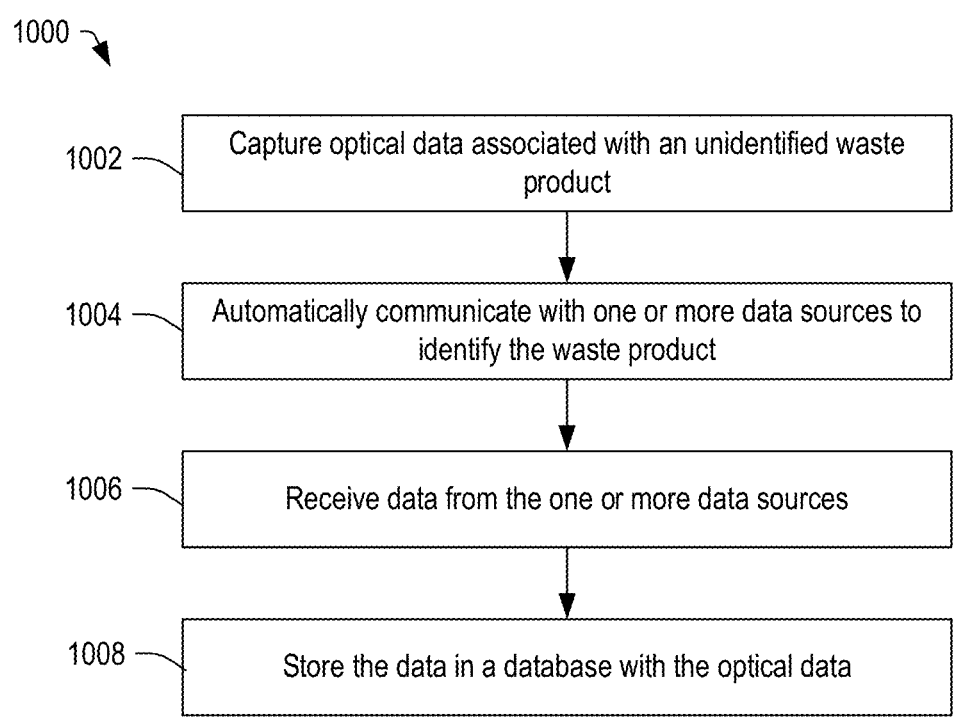
FIG. 10 is a flow diagram of a method of identifying an HHW product, in accordance with certain embodiments of the present disclosure.

FIG. 10 is a flow diagram of a method 1000 of identifying an HHW product, in accordance with certain embodiments of the present disclosure. At 1002, the method 1000 may include capturing optical data associated with an unidentified waste product. At 1004, the method 1000 may further include automatically communicating with one or more data sources to identify the waste product. The one or more data sources may include websites, company data, product data, social media websites, other sources, or any combination thereof. In certain embodiments, the system may process the optical data to perform optical character recognition (OCR) to extract text data, which may be used to search the data sources.

At 1006, the method 1000 may include receiving data from the one or more data sources. The data may include images, text, documents in various formats, or any combination thereof. Further, the data may be used to identify the HHW product. In certain embodiments, the received data, the images, and other information may be provided within a GUI to an operator to verify the identification.

At 1008, the method 1000 may include storing the data in the database with the optical data. In certain embodiments, the stored data may include a verified identification of the HHW product. In some embodiments, the retrieved data and the images may be stored for later retrieval and verification. Other embodiments are also possible.

Figure 11:
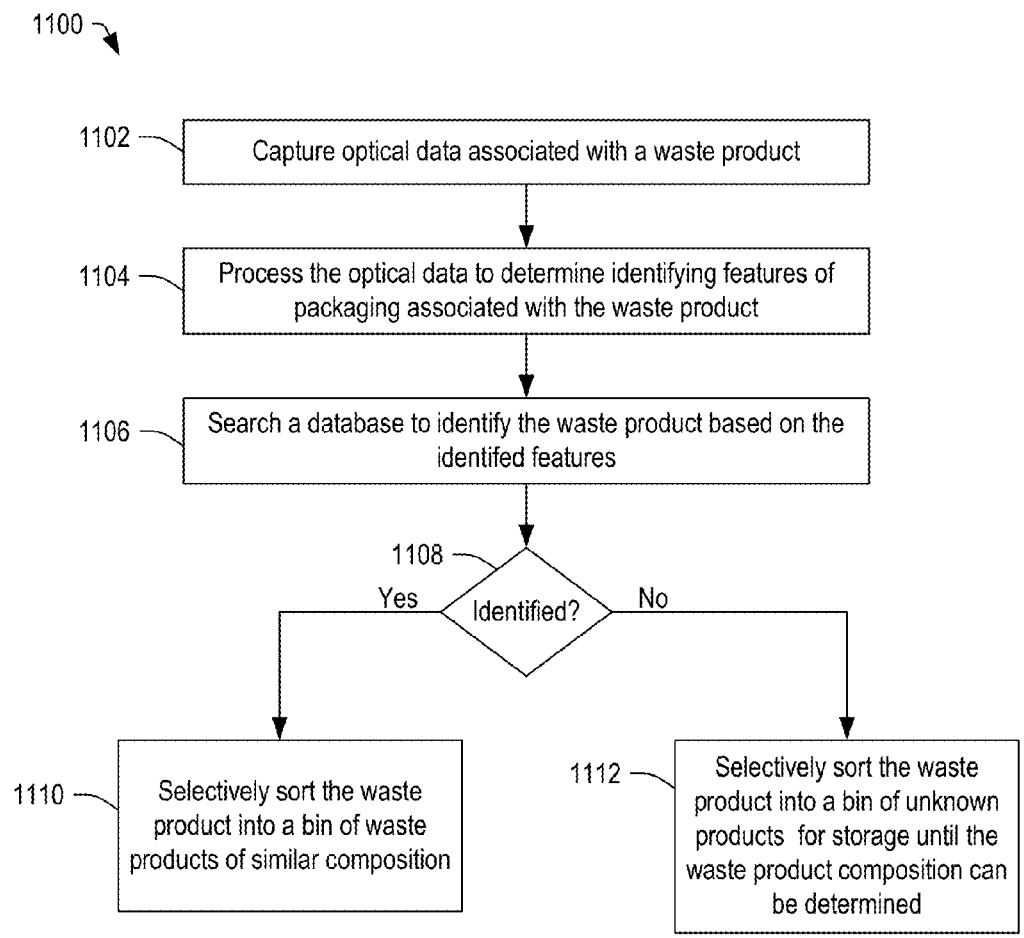
FIG. 11 is a flow diagram of a method of selectively sorting an HHW product based on image data, in accordance with certain embodiments of the present disclosure.

FIG. 11 is a flow diagram of a method 1100 of selectively sorting an HHW product based on image data, in accordance with certain embodiments of the present disclosure. At 1102, the method 1100 may include capturing optical data associated with a waste product. At 1104, the method 1100 may include processing the optical to determine identifying features of the packaging associated with the waste product. In certain embodiments, the identified features may include a bar code, text from the label, a shape of the bottle, other data, or any combination thereof.

At 1106, the method 1100 may include searching a database to identify the waste product based on the identified features. At 1108, if the waste product is identified, the method 1100 may include selectively sorting the waste product into a bin of waste products of similar composition, at 1110. Otherwise, at 1108, if the waste product is not identified, the method 1100 may include selectively sorting the waste product into a bin of unknown products for storage until the waste product composition can be determined, at 1112.

Figure 12:
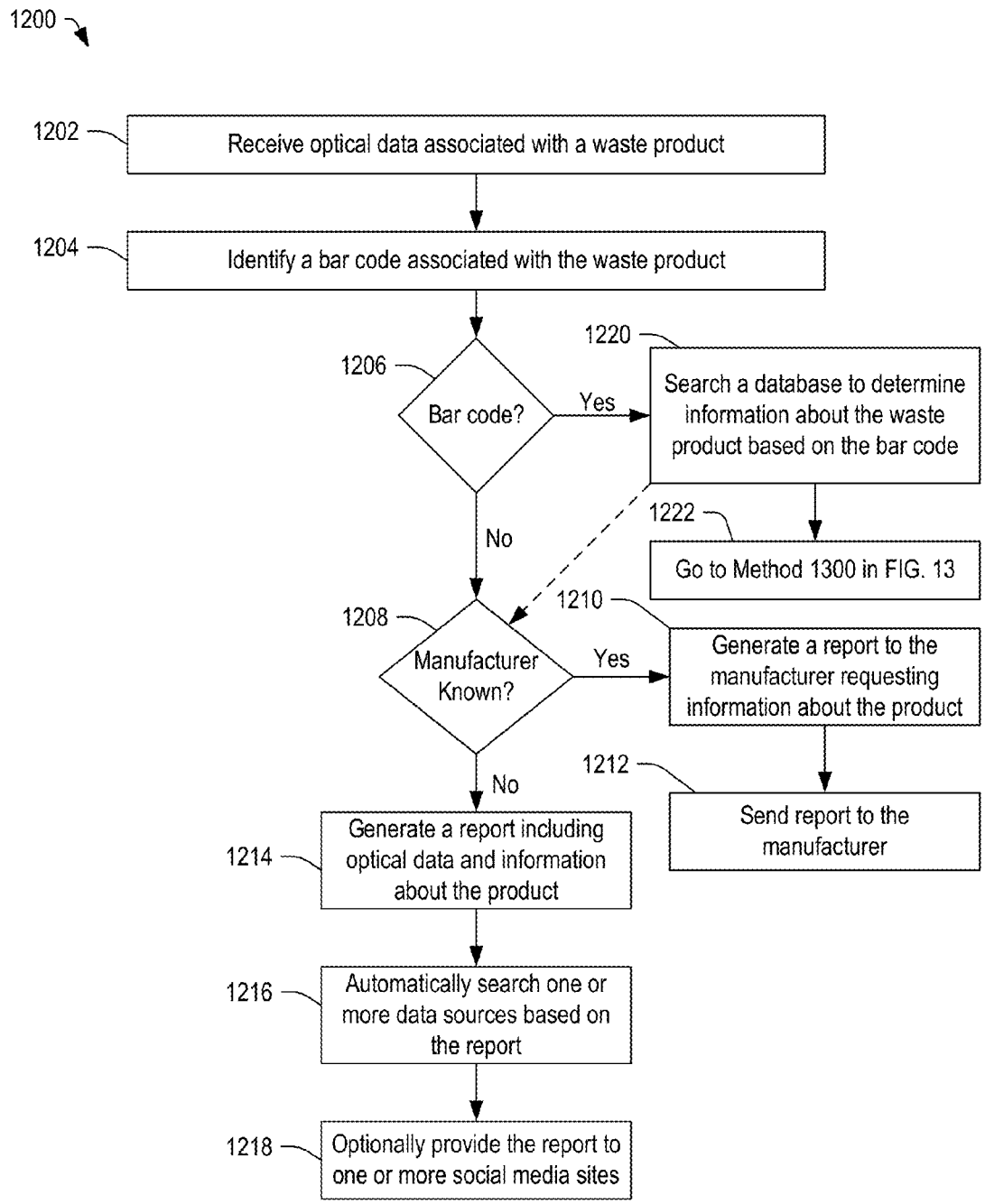
FIG. 12 is a flow diagram of a method of determining an HHW product, in accordance with certain embodiments of the present disclosure.

FIG. 12 is a flow diagram of a method 1200 of determining an HHW product, in accordance with certain embodiments of the present disclosure. At 1202, the method 1200 may include receiving one or more optical data associated with a waste product. At 1204, the method 1200 may include identifying a bar code associated with the product. In some examples, the bar code may be identified from the optical data. The bar code may then be used to search one or more databases, websites, documents, or any combination thereof.

At 1206, if the bar code is not known, the method 1200 may include determining whether the manufacturer is known, at 1208. The manufacturer may be determined from an optical character recognition operation performed on the optical data. If the manufacturer is known, the method 1200 may include generating a report to the manufacturer requesting information about the product, at 1210. At 1212, the method 1200 may further include sending the report to the manufacturer. The manufacturer may respond with data about the product, which may be appended to a database record corresponding to the product.

Returning to 1208, if the manufacturer is not known or cannot be determined (such as if the product label is torn or removed), the method 1200 may include generating a report including optical data (such as product images) and information about the product, at 1214. Such information may include any data that can be determined from the optical data or by employees. At 1216, the method 1200 may include automatically searching one or more data sources based on the report. The one or more data sources may include websites, databases, social media sites, other data sources, or any combination thereof. At 1218, the method 1200 may include optionally providing the report to one or more social media sites. As discussed above, it may be possible to entice consumers to try to solve the puzzle of the unidentified product. In some embodiments, a bounty may be offered to pay for information about the unidentified product, provided such information can be verified.

In certain embodiments, data received from the one or more data sources or determined from the social media sites may be aggregated and provided in a report to an operator, who may evaluate the veracity of the data to identify the product. Other embodiments are also possible.

Returning to 1206, if a bar code is available, the method 1200 may include searching a database to determine information about the waste product based on the bar code, at 1220. The method 1200 may then include, at 1222, advancing to the method 1300 in FIG. 13.

Figure 13:
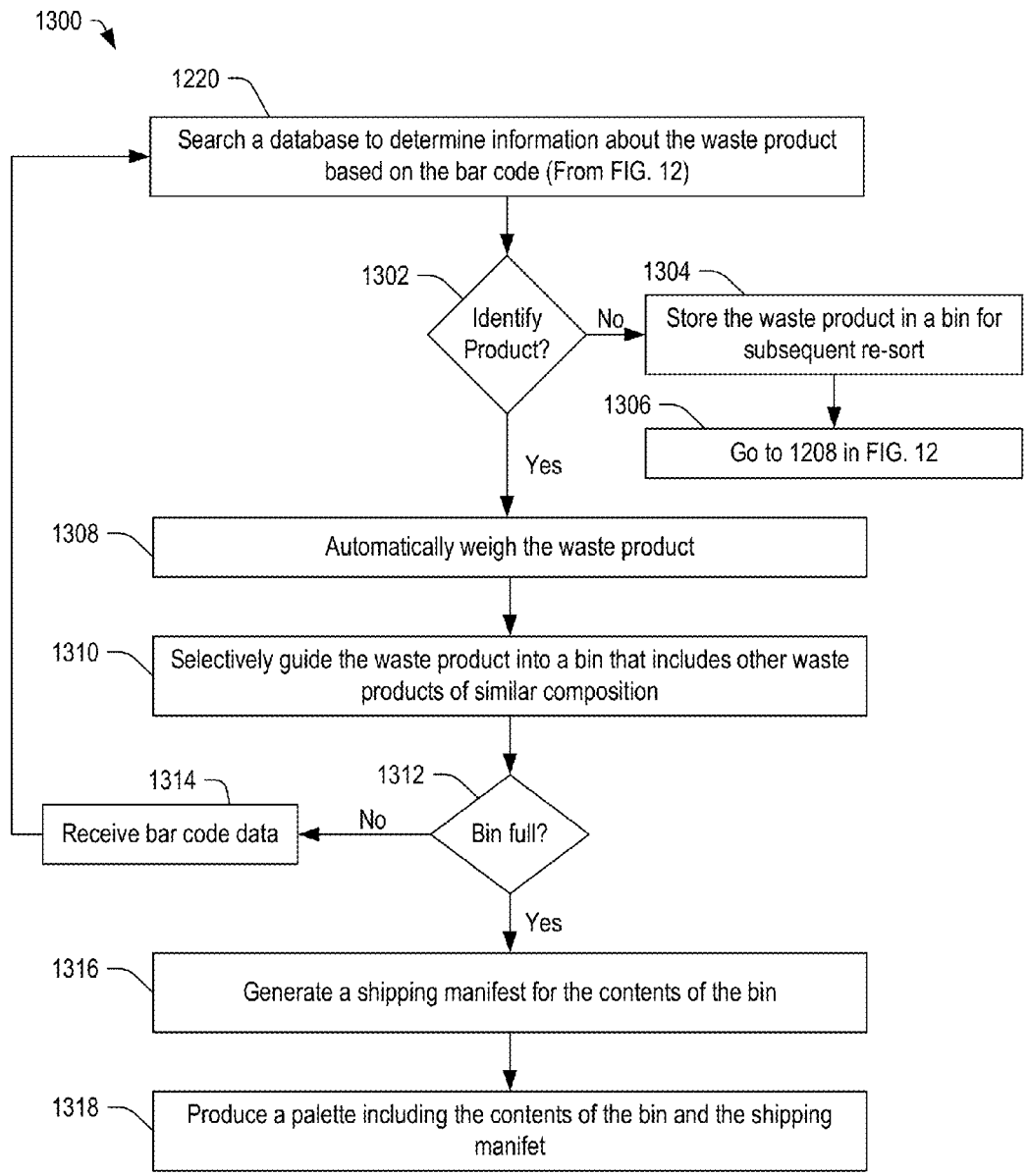
FIG. 13 is a flow diagram of a method of recovering HHW products for repurposing, in accordance with certain embodiments of the present disclosure.

FIG. 13 is a flow diagram of a method 1300 of recovering HHW products for repurposing, in accordance with certain embodiments of the present disclosure. At 1220, the method 1300 may include searching a database to determine information about the waste product based on the bar code. At 1302, if the product is not identified based on the database search, the method 1300 may include storing the waste product in a bin for a subsequent re-sort. The method 1300 may then include, at 1306, advancing to 1208 in FIG. 12.

Returning to 1302, if the product is identified, the method 1300 may include automatically weighing the waste product, at 1308. At 1310, the method 1300 may include selectively guiding the waste product into a bin that includes other waste products of similar composition.

At 1312, the method 1300 includes determining if the bin is full. The bin may be full if the bin includes a pre-determined number of items, if the bin has reached a pre-determined weight, if some other pre-determined parameter is met, or any combination thereof. If the bin is not full at 1312, the method 1300 includes receiving bar code data, at 1314. The method 1300 then returns to 1220 to search the database.

Otherwise, at 1312, if the bin is full, the method 1300 may include generating a shipping manifest for the contents of the bin, at 1316. The method 1300 may further include producing a palette including the contents of the bin and including the shipping manifest, at 1318.

In certain embodiments, the devices, systems, and methods discussed above with respect to FIGS. 1-13 make it possible to intercept waste products at a waste processing facility and to re-route the waste products to a destination other than a landfill, such as a recycling destination, a repurposing destination, another destination, or any combination thereof. Further, once re-routed, the waste products may be further processed to refine the sorting operation. For example, HHW waste products may be further processed by an HHW sorting system before they are classified as hazardous based on optical data captured from the product packaging. These items may then be categorized with other similar products to produce a bin of similar products that can be re-purposed or otherwise diverted from an expensive disposal option to a cheaper option by identifying the product composition from the information derived from the product packaging (either directly, by searching a database, or by search other data sources).

Figure 14:
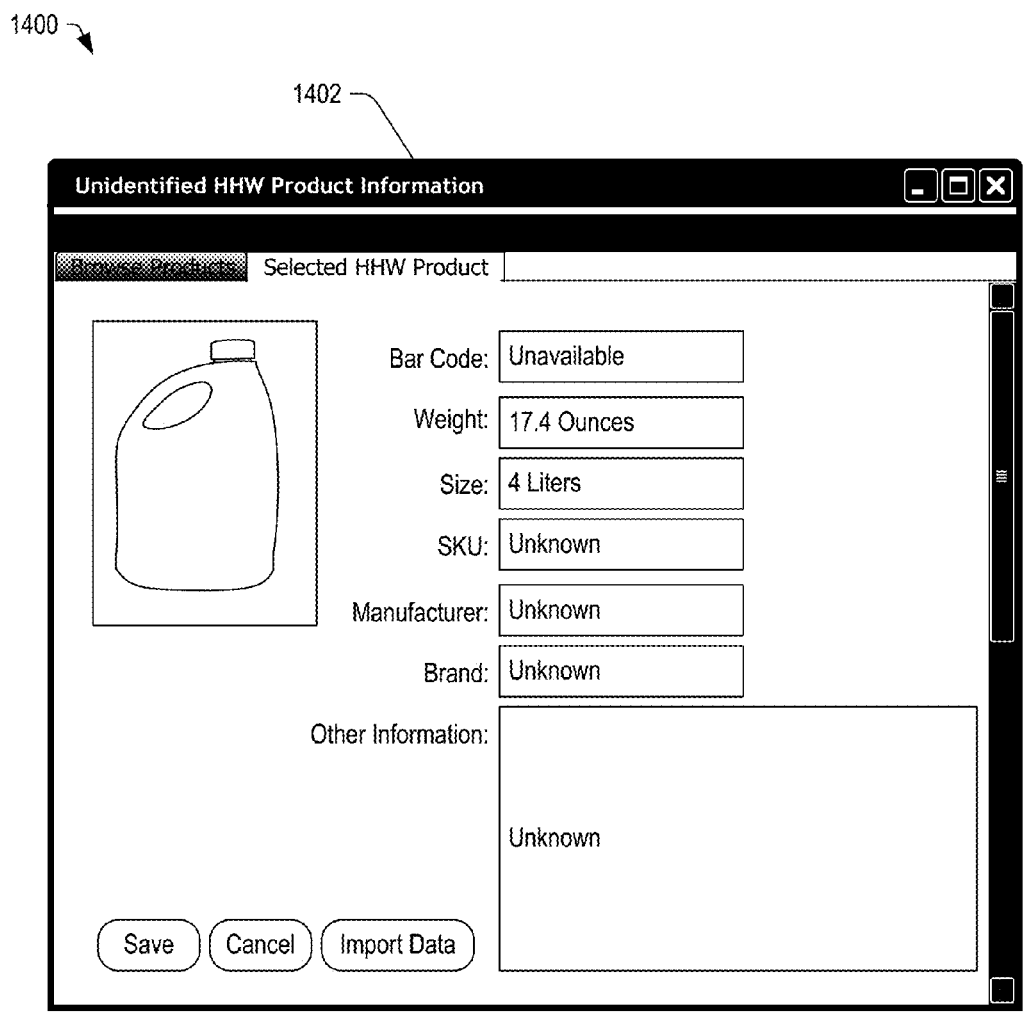
FIG. 14 is a diagram of an interface for identifying an unknown HHW product for repurposing, if possible, in accordance with certain embodiments of the present disclosure.

FIG. 14 is a diagram 1400 of an interface 1402 for identifying an unknown HHW product for repurposing, if possible, in accordance with certain embodiments of the present disclosure. The interface 1402 may include image data, text data, and user-selectable options accessible by a user to select a product and to update the product information. The user may import data by selecting an "Import Data" button and/or may update text fields with information about an HHW product, such as bleach. Changes may then be saved by selecting a "Save" button or may be canceled by selecting a "Cancel" button.

In some embodiments the interface 1402 may include one or more selectable tabs. In one example, the interface 1402 may include a "Browse Products" tab and may include a "Selected HHW Product" tab. The user may select a product by interacting with the "Browse Products" tab and may update the product information using the fields and selectable options available in the "Selected HHW Product" tab.

While the example of FIG. 14 shows buttons, tabs, and text fields, in certain embodiments, the interface 1402 may include clickable links, pull-down menus, check boxes, radio buttons, other user-selectable options, or any combination thereof. In certain embodiments, the interface 1402 may be rendered within an Internet browser application. In other embodiments, the interface 1402 may be rendered as a part of a stand-alone software application. Other embodiments are also possible.

In conjunction with the systems, methods, devices, and GUIs described above with respect to FIGS. 1-14, a waste product ID system is described that may include one or more optical sensors configured to capture optical data associated with a waste product on a conveyor system, for example. The waste product ID system may identify the waste product by comparing the optical data to data stored in a database. In response to identifying the waste product, the waste product ID system may apply a visible marker to the waste product and maintain the visible marker on the waste product as it moves along the conveyor system. The visible marker may be a light beam, which may have a color or shape, depending on the implementation. In some embodiments, the waste product ID system may control one or more lights associated with destination bins to direct a worker (or device) to provide the waste product to the destination bin. Other embodiments are also possible.

The processes, machines, and manufactures (and improvements thereof) described herein are particularly useful improvements for processing waste products including recyclable products and HHW products. Further, the embodiments and examples herein provide improvements in the technology of waste product sorting systems. In addition, embodiments and examples herein provide improvements to the functioning of a waste sorting system by processing optical data to identify types of waste products and by applying a visible marker to the identified waste products to assist in sorting. Further, the system may be configured to further process optical data from unknown waste products to identify product information so that subsequent sorting operations may identify the product.

Thus, the improvements herein provide for technical advantages, such as providing a system in which waste products can be identified based on optical data and can be diverted to a suitable destination for further processing, including diverting HHW products from burning so that they can be optionally repurposed or sold. In certain embodiments, the identified products can be diverted to a less expensive disposal option as compared to burning.

While technical fields, descriptions, improvements, and advantages are discussed herein, these are not exhaustive and the embodiments and examples provided herein can apply to other technical fields, can provide further technical advantages, can provide for improvements to other technologies, and can provide other benefits to technology. Further, each of the embodiments and examples may include any one or more improvements, benefits and advantages presented herein.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in the flow diagrams presented herein, in certain embodiments, blocks may be removed or combined without departing from the scope of the disclosure. Further, structural and functional elements within the diagram may be combined, in certain embodiments, without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:
   at least one optical sensor configured to capture optical data associated with a waste product; and
   at least one optical transmitter configured to emit a visible marker;
   a processor coupled to the at least one optical sensor and to the at least one optical transmitter, the processor configured to:
   automatically compare the optical data to data stored in a database to determine information about the waste product based on the optical data; and
   control the at least one optical transmitter to apply a visible marker to the waste product to selectively direct the waste product to a selected storage location in response to determining the information.

2. The system of claim 1, further comprising:
   an interface coupled to the processor and configured to couple to at least one light associated with a storage location; and
   wherein the processor is further configured to selectively apply a control signal to the interface to activate the at least one light in response to determining the information to identify the selected storage location.

3. The system of claim 1, wherein the visible marker comprises an illuminated location on the waste product.

4. The system of claim 1, wherein the visible marker comprises a selected color of light applied to a location on the waste product.

5. The system of claim 1, wherein the visible marker comprises at least one of a letter, a number, and a geometric shape.

6. The system of claim 5, wherein, when the comparison is inconclusive, the processor is configured to illuminate the waste product with a symbol indicating manual inspection.

7. A device comprising:
   one or more optical sensors configured to capture optical data associated with packaging of a waste product;
   one or more optical transmitters configured to emit a visual indicator;
   a processor coupled to the one or more optical sensors; and
   a memory accessible to the processor and configured to store instructions that, when executed cause the processor to:
   receive optical data corresponding to a waste product from the optical sensors;
   search one or more data sources to identify the waste product based on the optical data; and
   selectively direct the waste product to a selected destination in response to identifying the waste product by controlling the one or more optical transmitters to apply the visual indicator to the waste product to indicate the selected destination.

8. The device of claim 7, wherein the visible marker comprises at least one of a letter, a number, a color, and a geometric shape.

9. The device of claim 7, wherein the visible marker comprises an illuminated location on the waste product.

10. The device of claim 7, further comprising:
    an interface coupled to the processor and configured to couple to a plurality of lights, each light associated with one or more storage locations; and
    wherein the processor is further configured to provide a control signal to the interface to selectively illuminate a selected one of the plurality of lights corresponding to the selected destination in response to identifying the waste product.

11. The device of claim 7, wherein the processor is configured to determine information about the waste product by comparing the optical data to images stored in a database to determine a match.

12. The device of claim 11, wherein, when the comparison is inconclusive, the processor is configured to illuminate the waste product with a symbol indicating manual inspection.

13. A method comprising:
    receiving optical data corresponding to a waste product from one or more optical sensors of a waste product identification system;
    searching, using a processor, one or more data sources to identify the waste product based on the optical data; and
    in response to identifying the waste product, selectively directing the waste product to a selected destination including:
    controlling one or more optical transmitters to apply a visual indicator to the waste product; and
    selectively controlling a light of a plurality of lights associated with the selected destination to direct the waste product to the selected destination.

14. The method of claim 13, wherein the visual indicator includes at least one of a letter, a number, and a geometric shape.

15. The method of claim 13, wherein the visual indicator includes a light beam having a selected color parameter from a plurality of color parameters.

16. The method of claim 13, further comprising:
    in response to identifying a second waste product, selectively controlling one or more optical transmitters to apply a second visual indicator to the second waste product; and
    maintaining the visual indicator on the waste product and the second visual indicator on the second waste product substantially concurrently.

17. The method of claim 13, further comprising:
    determining movement of the waste product along a conveyor system; and
    adjusting the one or more optical transmitters to maintain the visual indicator on the waste product in response to determining the movement.

* * * * *